US007079397B2

(12) United States Patent
Huang et al.

(10) Patent No.: US 7,079,397 B2
(45) Date of Patent: Jul. 18, 2006

(54) MOBILE COMPUTER TILTING ARRANGEMENT

(75) Inventors: Chao-Ming Huang, Taipei (TW); Wen-Chieh Wang, Banchiau (TW); Chin-Ku Chuang, Junghe (TW)

(73) Assignee: Tatung Co., Ltd., Taipei (TW)

( * ) Notice: Subject to any disclaimer, the term of this patent is extended or adjusted under 35 U.S.C. 154(b) by 38 days.

(21) Appl. No.: 10/750,767

(22) Filed: Jan. 5, 2004

(65) Prior Publication Data

US 2004/0170002 A1 Sep. 2, 2004

(30) Foreign Application Priority Data

Feb. 27, 2003 (TW) .............................. 92203081 U

(51) Int. Cl.
*H05K 5/03* (2006.01)

(52) U.S. Cl. ....................... 361/725; 429/100; 206/219

(58) Field of Classification Search ........ 361/679–687, 361/724–727; 429/96–100; 206/219–222; 439/378–381; 264/39

See application file for complete search history.

(56) References Cited

U.S. PATENT DOCUMENTS

| | | | | |
|---|---|---|---|---|
| 5,191,276 | A * | 3/1993 | Zainaleain | 320/110 |
| 5,391,091 | A * | 2/1995 | Nations | 439/378 |
| 6,752,264 | B1 * | 6/2004 | Versluys | 206/219 |
| 2004/0222344 | A1 * | 11/2004 | Oddsen | 248/278.1 |

* cited by examiner

*Primary Examiner*—Hung Van Duong
(74) *Attorney, Agent, or Firm*—Bacon & Thomas, PLLC

(57) ABSTRACT

A mobile computer tilting arrangement is disclosed to include a casing, the casing comprising at least two recessed locating holes respectively disposed in at least two corners of the back side thereof, and two plugs selectively detachably press-fitted into two of the at least two recessed locating holes for supporting the casing on a flat surface in a sloping position, each plug comprising a center through hole, and a pin insertable into the center through hole to radially expand the respective plug into friction engagement with one recessed locating hole of the casing into which the respective plug is press-fitted.

10 Claims, 3 Drawing Sheets

21
120
12
20
13
130
110
11
10
1

MOBILE COMPUTER TILTING ARRANGEMENT

BACKGROUND OF THE INVENTION

1. Field of the Invention

The present invention relates to a mobile computer tilting arrangement and, more particularly, to such a mobile computer tilting arrange, which enables the mobile computer to be supported on the top of a table in a tilting position.

2. Description of Related Art

The display module of a conventional mobile computer can only be supported and turned in one particular direction. Following fast development of computer technology, the display window of a computer can alternatively be changed between a longitudinal mode and a transverse mode. Conventional fixed display support designs cannot satisfy market requirements. Further, when a tablet PC (personal computer) is put on the top of a table, the light reflecting status of the display screen may interfere with the working of the user.

Therefore, it is desirable to have a mobile computer tilting arrangement that enables the mobile computer to be selectively supported on a flat surface in longitudinally extended sloping position or a transversely extended sloping position as desired.

SUMMARY OF THE INVENTION

It is the main object of the present invention to provide a mobile computer tilting arrangement, which enables the mobile computer to be longitudinally or transversely supported on a flat surface in a sloping position as desired.

To achieve these and other objects of the present invention, the mobile computer tilting arrangement comprises a casing, and two plugs. The casing comprise a back side, and at least two recessed locating holes respectively disposed in at least two corners of the back side. The plugs are selectively press-fitted to two of the at least two locating holes adjacent to the same peripheral side for supporting the casing on a flat surface in a sloping position. Each plug comprise a center through hole, and a pin insertable into the center through hole to radially expand the respective plug into friction engagement, within one recessed locating hole of the casing into which the respective plug is press-fitted. The outer diameter of the pin is slightly greater than the inner diameter of the center through hole of each plug. The two plugs each comprise a head on one end. The head of each plug comprising an upper side and a bottom side, wherein the bottom side is stopped outside the back side of the casing when the respective plug inserted into one recessed locating hole of the casing. The pin is preferably made from metal, comprising a pull tab at one end. The pull tab is preferably pivoted to the pin. Through the pull tab, the pin can easily be disconnected from the respective plug, for enabling the respective plug to be removed from the casing. By means of changing the positioning of the plugs in the recessed locating holes of the casing, the plugs can selectively support the casing on a flat surface in an axially extended sloping position or a transversely extended sloping position as desired. The plugs are molded from rubber or made from suitable elastic material, each comprising a recess on the upper surface of the head for receiving the pull tab of the respective pin in flush with the upper surface of the head of the corresponding plug, and a finger notch through which the finger can be inserted to lift the pull tab. The pull tab can be shaped like a ring, a triangular or rectangular frame, or any of a variety of profiles. The shape of the recess fits the profile of the pull tab.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
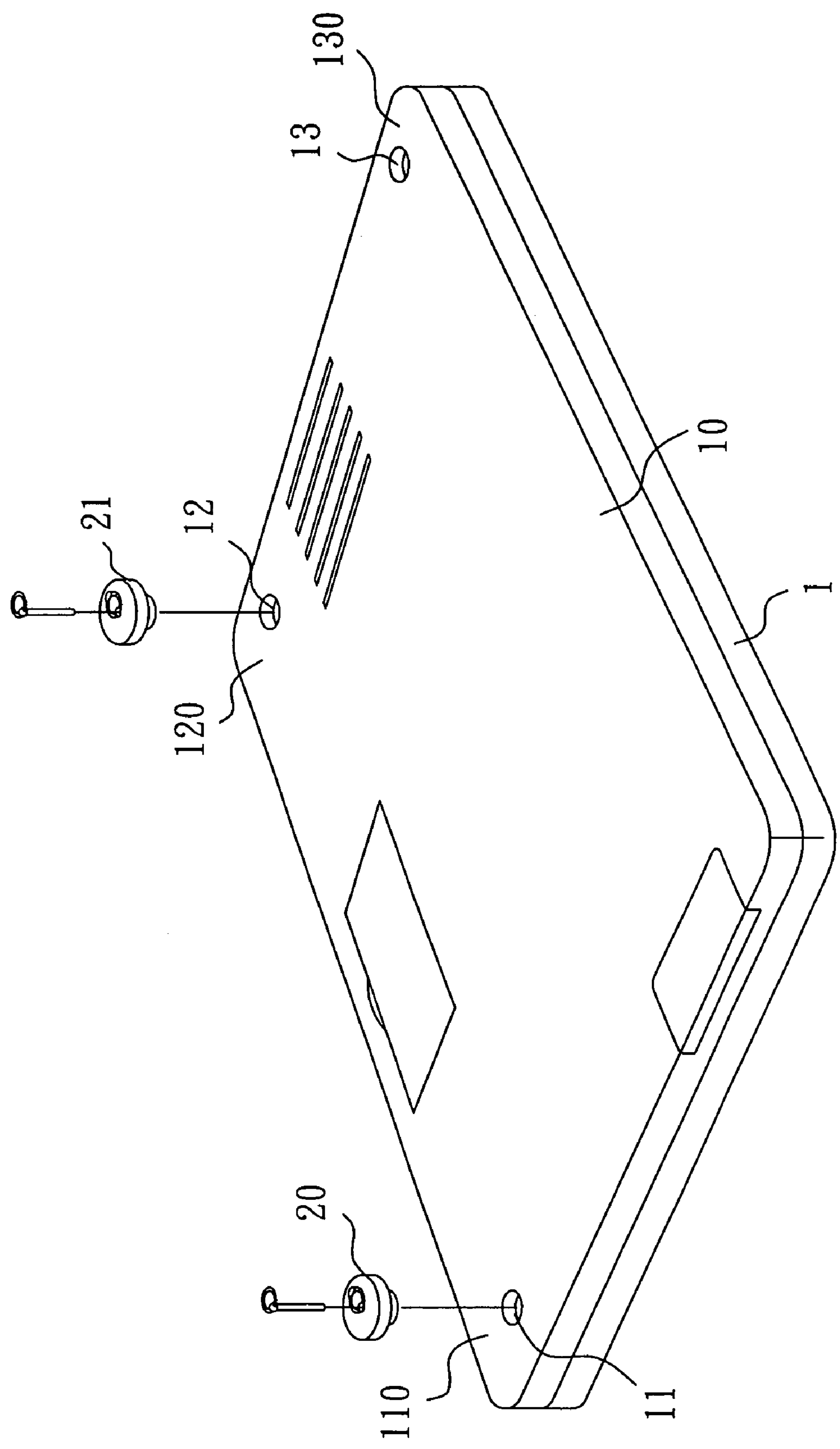
FIG. 1 is a rearview of a casing of a mobile computer tilting arrangement according to the preferred embodiment of the present invention.

Referring to FIG. 1, a mobile computer tilting arrangement in accordance with the present invention is shown comprising a casing 1 of a mobile computer, and two elastic plugs 20 and 21. The casing 1 has a back side 10, and three recessed locating holes 11,12, and 13 respectively disposed in three corners 110,120, and 130 of the back side 10. The two elastic plugs 20 and 21 are selectively press-fitted into two of the three recessed locating holes 11,12, and 13 that are disposed adjacent to one same peripheral side of the casing 1. Further, the elastic plugs 20 and 21 are preferably molded from rubber.

Figure 2:
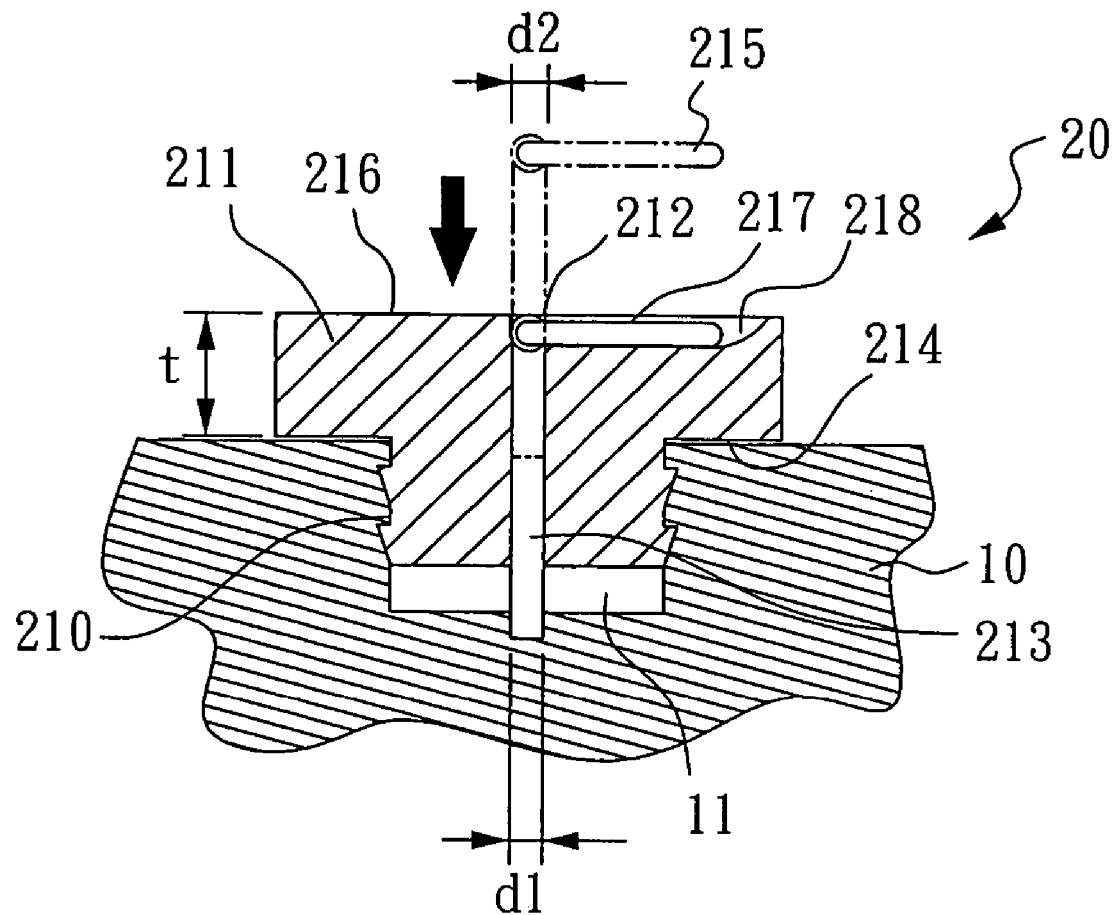
FIG. 2 is a schematic sectional view showing the installation of one plug in one recessed locating hole of the casing according to the present invention.
Figure 3:
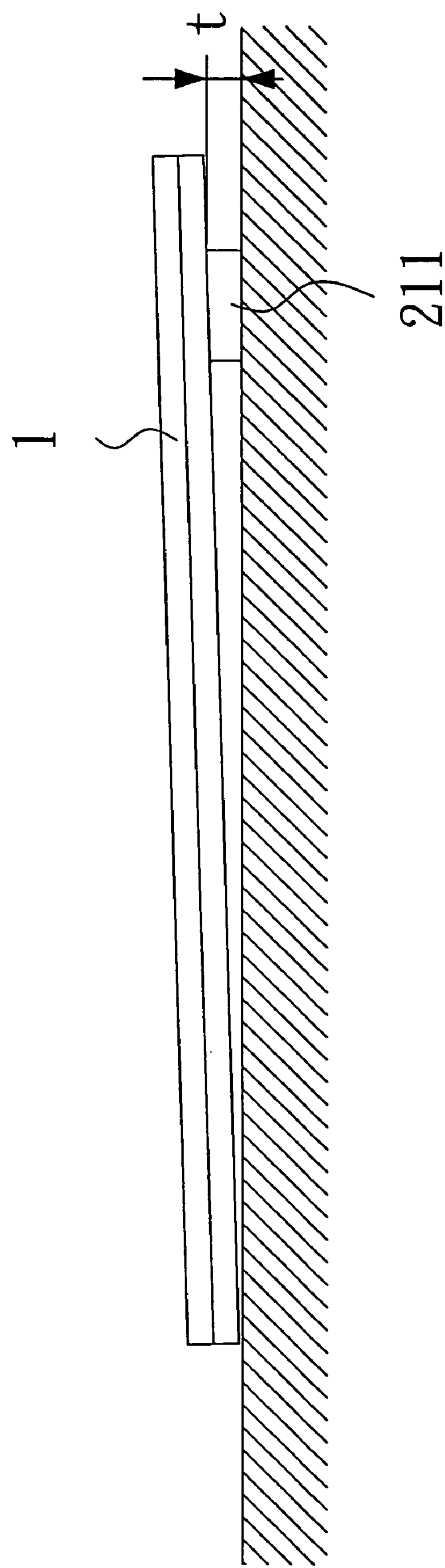
FIG. 3 is a schematic drawing showing the casing supported on the top of a table in a sloping position.

Referring to FIGS. 2 and 3, each plug 20 comprises a head 211, a center through hole 212 axially piercing through the center of the plug 20, a pin 213 inserted through the center through hole 212, and a pull tab, for example, a pull ring 215, which is pivoted to one end of the pin 213. The pin 213 is a cylindrical metal member comprising an outer diameter d2 slightly greater than the inner diameter d1 of the center through hole 212. When in use, the plug 20 is press-fitted into one of the recessed locating holes 11, keeping the flat bottom side 214 of the head 211 stopped at the back side 10 of the casing 1 (see also FIG. 1), and then the pin 213 is inserted into the center through hole 212 to expand the plug 20 radially and to force the peripherally ribbed outer surface 210 of the plug 20 shank into friction-engagement with the peripheral wall inside of the corresponding recessed locating hole 11. After installation of two plugs 20,21 into any of the two recessed locating holes 11, 12, 13 neighboring to one same peripheral side of the casing 1, the casing 1 of a mobile computer can be supported on the top of a table in a tilting angle t (see FIG. 3).

Referring to FIG. 2 again, the head 211 has a positioning recess 217 on the flat upper surface 216 where the pull ring 215 is kept in flush with the flat upper surface 216 of the head 211. The head 211 further comprising a finger notch 218 disposed in the flat upper surface 216 in communication with the positioning recess 217. The user can insert the finger into the finger notch 218 to lift the pull ring 215 and then to pull the pin 213 out of the respective plug 20, enabling the respective plug 20,21 to be removed from the corresponding recessed locating hole 11, 12, 13.

Referring to FIGS. 1~3 again, by means of selectively fastening the two plugs 20,21 to any of two of the recessed locating hole 11, 12, and 13, the plugs 20,21 can support the casing 1 of the mobile computer in an axially tilted sloping position or transversely tilted sloping position.

Although the present invention has been explained in relation to its preferred embodiments, it is to be understood that many other possible modifications and variations can be made without departing from the spirit and scope of the invention as hereinafter claimed.

What is claimed is:

1. A mobile computer tilting arrangement comprising:

a casing, said casing having a back side and at least two recessed locating holes respectively disposed in at least two corners of said back side;

two plugs to be respectively press-fitted to two of said at least two recessed locating holes adjacent to one same peripheral side of said casing, said plugs each comprising a center through hole, a head having a bottom side and an upper surface, and a pin insertable into said center through hole to radially expand the respective plug into friction engagement with one of said at least two recessed locating holes of said casing into which the respective plug is press-fitted, said pin having an outer diameter greater than an inner diameter of said center through hole and said head having a recess on said upper surface, wherein said plugs extend from locating holes to support said mobile computer.

2. The mobile computer tilting arrangement as claimed in claim 1, wherein the bottom side of said head is stopped outside the back side of said casing when one of said plugs is inserted into one of said at least two recessed locating holes of said casing.

3. The mobile computer tilting arrangement as claimed in claim 1, wherein said head further comprises a finger notch disposed in the upper surface and connected to said recess.

4. The mobile computer tilting arrangement as claimed in claim 1, wherein the outer surface of the shank of each of said plugs is peripherally ribbed.

5. The mobile computer tilting arrangement as claimed in claim 1, wherein each of said plugs is respectively molded from rubber.

6. The mobile computer tilting arrangement as claimed in claim 1, wherein said at least two recessed locating holes are each peripherally ribbed on an inside wall.

7. The mobile computer tilting arrangement as claimed in claim 1, wherein the pin of each of said plugs is respectively made from metal.

8. The mobile computer tilting arrangement as claimed in claim 1, wherein the pin of each of said plugs further comprises a pull tab at one end.

9. The mobile computer tilting arrangement as claimed in claim 8, wherein said pull tab is fastened pivotally with said end of said pin.

10. The mobile computer tilting arrangement as claimed in claim 8, wherein said pull tab is a pull ring.

* * * * *